United States Patent Office 3,447,323
Patented June 3, 1969

3,447,323
HYPERGOLIC METHOD FOR IGNITING HIGH ENERGY DIFLUOROAMINO COMPOUNDS
Barry D. Allan, Huntsville, Ala., assignor to the United States of America as represented by the Secretary of the Army
No Drawing. Filed July 26, 1967, Ser. No. 657,722
Int. Cl. C06d 5/08; C06b 15/00
U.S. Cl. 60—205
9 Claims

ABSTRACT OF THE DISCLOSURE

The method for achieving hypergolic ignition by bringing high energy compounds characterized by the presence of difluoroamino groups into contact with a second compound which is either antimony pentachloride, aluminum chloride, gallium trichloride or titanium tetrachloride.

CROSS-REFERENCE TO RELATED APPLICATION

This application is a continuation-in-part of applicant's copending application Ser. No. 259,796, filed Feb. 18, 1963.

SUMMARY OF THE INVENTION

It has recently been determined that chemical compounds characterized by the presence of the difluoroamino group are extremely useful as components in liquid propellant rocket engines because of their exceptional high energy content. Illustrative of these compounds are those corresponding to the formula

wherein R, R' and R" are each selected from the group consisting of hydrogen, difluoroamino groups (—NF$_2$), halogen, alkyl, difluoroamino substituted alkyl, alkoxy, difluoroamino substituted alkoxy, alkenoxy, difluoroamino substituted alkenoxy, carbalkoxy, difluoroamino substituted carbalkoxy, carboxy, difluoroamino substituted carboxy, carbalkenoxy, difluoroamino substituted carbalkenoxy, alkanoyloxy, difluoroamino substituted alkanoyloxy, hydroxyalkyl, difluoroamino substituted hydroxyalkyl, haloalkyl, difluoroamino substituted haloalkyl, alkoxyalkyl, difluoroamino substituted alkoxyalkyl, alkenyl, and difluoroamino substituted alkenyl. Because of availability, stability, and manufacturing consideration, a preferred group of difluoroamino substituted compounds corresponds to the formula

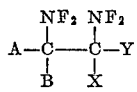

wherein A, B, X, and Y are each members selected from the group consisting of hydrogen and lower alkyl groups of up to four carbon atoms. The total number of carbon atoms should not exceed six since increases in the molecular weight results in an increase in viscosity or even solidification, obviously a limiting factor for use in liquid fueled rocket motors. The ability to undergo hypergolic ignition is not affected, however, even if the carbon content exceeds six. A detailed description of the method for preparing compounds of this type is presented in my copending application, Ser. No. 254,510, filed Jan. 28, 1963.

In liquid fueled rocket engines it is extremely advantageous to have available means by which hypergolic ignition can be achieved. Hypergolic ignition assures that the fuel mixture will ignite spontaneously and thus prevents firing failures or explosions resulting from the igniting of excess quantities of fuel in the combustion chamber due to delayed ignition. In larger rockets, where the engines are sometimes stopped and re-ignited in flight, hypergolic ignition can serve as a back-up for other conventional ignition means to insure re-ignition or the hypergolic ignition means can be the only igniting mechanism.

It has now been determined that the new class of high energy compounds characterized by the presence of the difluoroamino group —NF$_2$, undergo hypergolic ignition when contacted with antimony pentachloride, gallium trichloride, titanium tetrachloride, and aluminum chloride. Thus, the present invention adds the advantage of hypergolic ignition to the new class of high energy compounds.

In accordance with the foregoing, it is an object of the present invention to provide a method for achieving hypergolic ignition of compounds characterized by the presence of the difluoroamino group.

A further object of the invention is to provide a method for achieving hypergolic ignition in liquid fueled rocket engines utilizing in the propellant compounds characterized by the presence of the difluoroamino group.

The manner in which these and other objects may be achieved will become apparent from the detailed description presented hereinbelow.

DESCRIPTION OF THE PREFERRED EMBODIMENT

To achieve ignition of difluoroamino substituted compounds, all that is required is that a trace amount of antimony pentachloride, aluminum chloride, gallium trichloride, or titanium tetrachloride be contacted with the compound containing the difluoroamino group. Upon contact, ignition is spontaneous. As should be apparent to those skilled in the art, all of the above listed compounds are members of the Lewis acid group. Other experiments with additional Lewis acids will no doubt reveal more hypergolic additives.

Open dish tests were performed with 1,2-bis(difluoroamino)-butane, 2,3-bis(difluoroamino)-butane, 1,2-bis(difluoroamino) - 2 - methyl-propane, and tris(difluoroamino) fluoro methane. A small sample comprising a few milliliters of each compound was placed in open dishes. Into these samples was placed a single drop of antimony pentachloride, aluminum chloride, gallium trichloride or titanium tetrachloride. Each compound was tested with each of the metal chlorides. In all cases, ignition was spontaneous upon contact.

To test the operativeness of the hypergolic ignition in an actual rocket motor, tests were made with a 250 pound thrust motor using as a propellant 1,2-bis(difluoroamino)-2-methyl-propane. The propellant was injected into the combustion chamber in three impinging streams. A few drops of antimony pentachloride injected into the combustion chamber and directed at the point of impingement caused spontaneous ignition with only a 10 millisecond to 15 millisecond ignition delay. Repeated test at combustion chamber pressure of 100 p.s.i., 350 p.s.i., and 600 p.s.i. always gave instantaneous ignition upon contact of the propellant mixture with antimony pentachloride.

The propellant used in these tests is by no means the only one which can be ignited according to the method of the invention. As pointed out in the discussion of the open dish tests, the only critical aspect in achieving hypergolic ignition is the contacting of one of the specified metal chlorides with a difluoroamino derivative. A discussion of other suitable monopropellant mixtures is given in the copending application referred to hereinabove. A particularly useful fuel composition that can be ignited according to the invention is a mixture of 1,2-bis (difluoroamino)-2-methyl-propane and anhydrous nitric acid in a molar ratio of difluoroamino compound to acid of 2.25:1.0.

The hypergolic ignition means is not limited to monopropellant compositions. The difluoroamino substituted compounds or mixtures thereof may be injected into the combustion chamber along with separate injections of a suitable oxidizer such as red fuming nitric acid, anhydrous nitric acid, or dinitrogen tetroxide. The metal chloride is injected into the chamber so that it contacts the difluoroamino substituted compounds and ignites the propellant. An example of a suitable bipropellant is one wherein 1,2-bis(difluoroamino) - 2 - methyl-propane and dinitrogen tetroxide are simultaneously injected into the combustion chamber in such a manner that the ratio of dinitrogen tetroxide to the difluoroamino substituted compound is 1.5:1.0.

The actual means employed for contacting the metal chloride with the difluoroamino substituted compound is immaterial and will depend on the particular rocket motor. A few drops can be injected into the chamber, a continuous stream sprayed into the chamber, or the metal chloride can be prepositioned in the chamber.

Hypergolic ignitions of this general type used in rocketry are referred to in the art as "slug-hypergol starts." Any of the conventional apparatus used for these types of ignitions can be used as is, or easily adapted to the present invention. Examples of materials previously used in this manner are red fuming nitric acid and hydrazine or red fuming nitric acid and unsymmetrical dimethyl hydrazine. It is obvious that it is not necessary that the rocket motor actually employ the difluoroamino derivative as a propellant component to utilize the present invention. The specified metal chlorides and one or more difluoroamnio substituted compounds can be contacted in the combustion chamber to cause spontaneous combustion which in turn ignites the actual propellants. Since the difluoroamino derivatives tend to be sensitive to shock, they ordinarily will contain trace amounts of desensitizers such as dinitrogen tetroxide. However, this in no way affects their ability to undergo hypergolic ignition according to the invention.

As aluminum trichloride is a solid, it will sometimes be advantageous to dissolve it in a suitable solvent such as carbon tetrachloride in order that it may be injected into the combustion chamber. However, solid particles of aluminum chloride may be disposed within the combustion chamber to contact the difluoroamino substituted compounds and thus cause ignition.

The only critical aspect of the invention appears to be keeping the metal chlorides free from water or water vapor. The chlorides are hydroscopic and water hydrolyzes the chlorides rendering them ineffective. Therefore, care should be taken to keep the chlorides dry.

As should be apparent to those skilled in the art, the present invention is not limited to the ignition of rocket motors although this is probably the areas where greatest use will occur. In any application where a means of igniting materials is needed, ignition can be accomplished by contacting one of the specified chlorides with difluoroamino substituted compounds.

The foregoing detailed description is for the purpose of illustration only and no undue limitation of the invention is intended except as reflected in the appended claims.

I claim:
1. The method of igniting a difluoroamino substituted compound of the formula

wherein R, R', and R" are each selected from the group consisting of hydrogen, difluoroamino group, halogen, alkyl, difluoroamino substituted alkyl, alkoxy, difluoroamino substituted alkoxy, alkenoxy, difluoroamino substituted alkenoxy, carbalkoxy, difluoroamino substituted carbalkoxy, carboxy, difluoroamino substituted carboxy, carbalkenoxy, difluoroamino substituted carbalkenoxy, alkanoyloxy, difluoroamino substituted alkanoyloxy, hydroxyalkyl, difluoroamino substituted hydroxyalkyl, haloalkyl, difluoroamino substituted haloalkyl, alkoxyalkyl, difluoroamino substituted alkoxyalkyl, alkenyl, and difluoroamino substituted alkenyl; said method comprising bringing said compound into contact with a second compound selected from the group consisting of antimony pentachloride, aluminum chloride, gallium trichloride, and titanium tetrachloride.

2. The method according to claim 1, wherein R, R', and R" are each selected from the group consisting of hydrogen, alkyl, alkenyl, alkoxy, alkenoxy, carbalkoxy, carboxy, carbalkenoxy, alkanoyloxy, hydroxyalkyl, haloalkyl, and alkoxyalkyl.

3. The method according to claim 1, wherein said R and R' are each a difluoroamino group.

4. The method according to claim 1, wherein said R and R' are each a difluoroamino group and said R" is fluorine.

5. The method of igniting a difluoroamino substituted compound of the formula

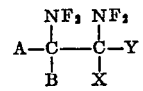

wherein A, B, X, and Y are each members selected from the group consisting of hydrogen and lower alkyl groups of up to four carbon atoms, the total number of carbon atoms in A, B, X, and Y not to exceed six; said method comprising bringing said compound into contact with a second compound selected from the group consisting of antimony pentachloride, aluminum chloride, gallium trichloride, and titanium tetrachloride.

6. The method according to claim 5, wherein said difluoroamino substituted compound is contacted with antimony pentachloride.

7. The method according to claim 6, wherein said A and B are methyl groups and X and Y are hydrogen.

8. The method according to claim 6, wherein said A and Y are methyl and B and X are hydrogen.

9. The method according to claim 6, wherein A, B, and X are hydrogen and Y is ethyl.

References Cited

UNITED STATES PATENTS

| | | | |
|---|---|---|---|
| 3,103,782 | 9/1963 | Olah et al. | 149—36 X |
| 3,177,652 | 4/1965 | Lewis | 149—36 X |
| 3,341,596 | 9/1967 | Rhodes et al. | 149—36 X |
| 3,345,414 | 10/1967 | Rhodes | 260—583 |
| 3,345,821 | 10/1967 | Magee | 60—214 |

BENJAMIN R. PADGETT, *Primary Examiner.*

U.S. Cl. X.R.

60—211, 215, 219; 149—36, 74, 109